United States Patent [19]

Sproul, III

[11] Patent Number: 4,498,136
[45] Date of Patent: Feb. 5, 1985

[54] INTERRUPT PROCESSOR

[75] Inventor: William W. Sproul, III, Reston, Va.

[73] Assignee: IBM Corporation, Armonk, N.Y.

[21] Appl. No.: 449,923

[22] Filed: Dec. 15, 1982

[51] Int. Cl.³ .......................... G06F 9/30; G06F 9/38; G06F 9/32
[52] U.S. Cl. .................................................. 364/200
[58] Field of Search ... 364/200 MS File, 900 MS File

[56] References Cited

U.S. PATENT DOCUMENTS

| 3,793,631 | 2/1974 | Silverstein et al. | |
| 4,025,771 | 5/1977 | Lynch | 235/156 |
| 4,041,461 | 8/1977 | Kratz | 364/200 |
| 4,179,736 | 12/1979 | Wilhite | 364/200 |
| 4,371,927 | 2/1983 | Wilhite | 364/200 |
| 4,399,507 | 8/1983 | Cosgrove | 364/200 |

Primary Examiner—James D. Thomas
Assistant Examiner—Florin B. Munteanu-Ramnic
Attorney, Agent, or Firm—John E. Hoel

[57] ABSTRACT

An interrupt processor is disclosed for an instruction pipelined digital processor, which includes an instruction classification system with a logic class decoder, a multistage, pipelined, interruptible-sequence detector, a multistage variable-return-address generator, and an active instruction completion, suppression, and termination control, to enable interrupting a sequence of instructions which execute out-of-order in the pipelined and digital processor, and to enable allowing a subsequent return to the interrupted program to resume processing of that program without error.

2 Claims, 2 Drawing Figures

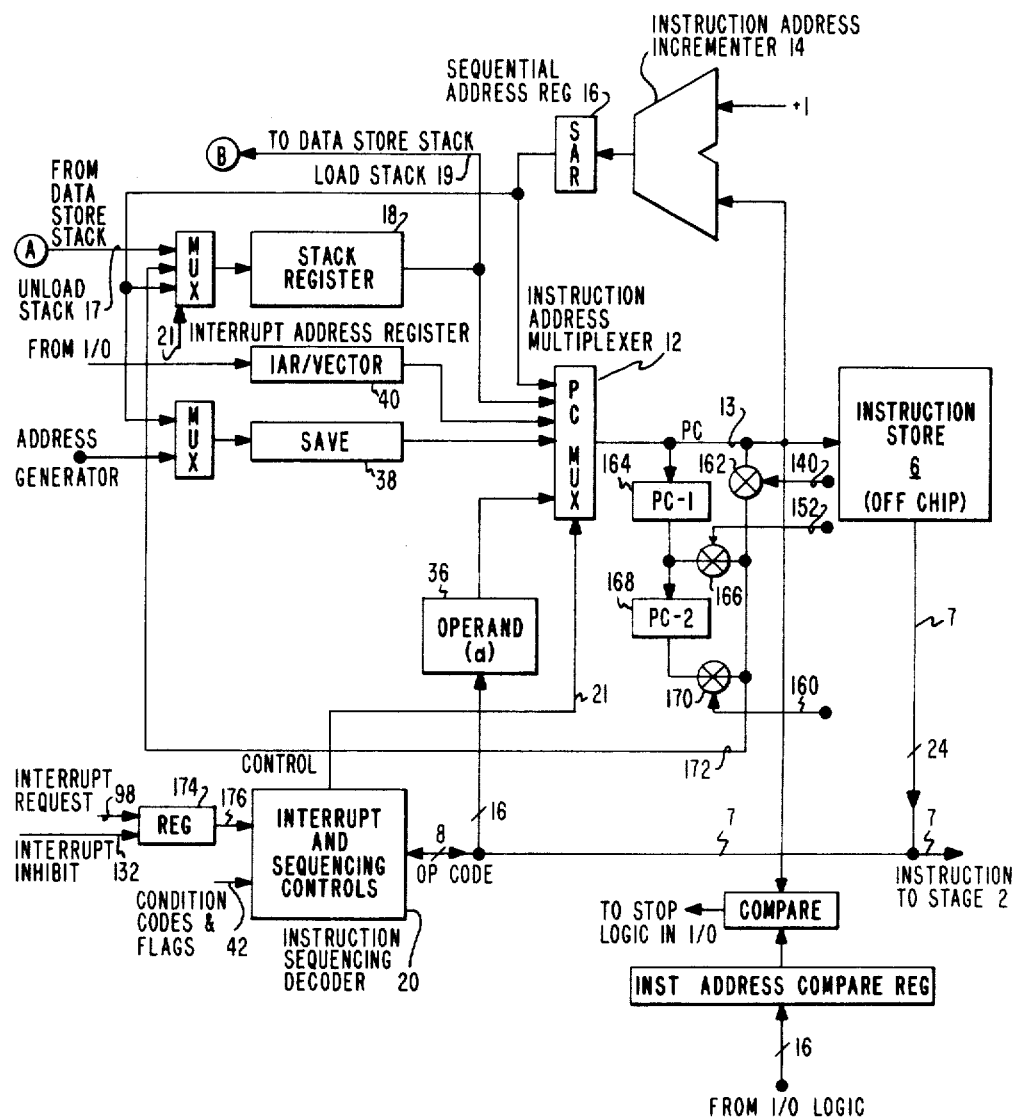

INTERRUPT PROCESSOR

FIELD OF THE INVENTION

The invention disclosed broadly relates to digital processors and more particularly relates to an interrupt controller for an instruction pipelined digital processor.

BACKGROUND OF THE INVENTION

Instruction pipelines having a plurality of instruction fetching and processing stages or phases, cannot be gracefully interrupted for certain sequential patterns of instructions in the pipeline. Attempts have been made in the prior art to address this problem, for example U.S. Pat. No. 3,793,631 describes a modified pipeline processor which allows concurrent instruction execution and next instruction fetch operations. An interrupt mechanism described in the patent is of a conventional design so that when an interrupt is accepted, it allows the current operation to complete itself and then branches to the interrupt routine. This imposes the disadvantage that all interrupts must wait until the longest operation is completed before the interrupt can be executed.

Another instruction pipelined processor is described in the copending M. R. Cosgrove, et al. patent application entitled "Instruction Address Stack in the Data Memory of an Instruction-Pipelined Processor, Ser. No. 280,417, filed June 30, 1981 (assigned to the common assignee), now U.S. Pat. No. 4,399,507.

The interrupt processor invention disclosed herein finds application in conjunction with the instruction pipeline of Cosgrove, et al. Thus, the following description of the Cosgrove, et al. instruction pipeline is provided as a background to the interrupt processor invention herein. The four instruction pipeline stages or phases shown in FIG. 1 of Cosgrove, et al. are:

1. I Fetch and Sequence Control, which performs program sequencing, branching, and instruction fetching.
2. Address Generator, which contains base and index registers and generates data storage addresses.
3. Data Storage Controller, which controls reads and writes of the data store.
4. Arithmetic/Logic Unit (ALU), which performs arithmetic operations and contains data registers.

Each machine instruction passes through these four stages, one stage at a time, each cycle. Being pipelined, a new instruction enters the pipe in the first stage each cycle. Thus, there may be four instructions in different stages of execution in the pipeline at any one time. Different types of instructions are executed in different stages of the pipeline. An unconditional branch, for example, is executed in the first stage in its first cycle of the pipeline. An add operation, on the other hand, does not get to the ALU stage to complete its execution until the fourth cycle of its staging through the pipeline. These different cycles of instruction execution for different classes of instructions can cause out-of-order execution of the programmed instructions. For most efficient utilization of the machine, the programmer (with the aid of an optimizing assembler) should actually take advantage of out-of-order execution to keep the pipeline fully running with a new instruction each cycle. By taking advantage of the out-of-order execution, the optimized code will be incompatible with running on a machine that would fully execute each instruction, one instruction at a time. It is also incompatible with running on this machine and being arbitrarily interrupted at the completion of any instruction.

To characterize the pipelined execution in the Cosgrove, et al. processor, consider the following sequence of operations which would be used in an eight way branch based on three compare operations:

TABLE I

1. Compare A
2. Branch A
3. Compare B
4. Branch B
5. Compare C
6. Branch C

This sequence of instructions cannot operate properly in the Cosgrove, et al. pipelined processor because the compare operation will not be executed until its fourth cycle in the pipe while the branch operation is executed in its first cycle. For proper operation some no-operation instructions (NOPs) must be inserted between each compare operation and its dependent branch operation as in the following example:

TABLE II

1. Compare A
2. NOP
3. NOP
4. Branch A
5. Compare B
6. NOP
7. NOP
8. Branch B
9. Compare C
10. NOP
11. NOP
12. Branch C Now each compare operation will complete execution just in time to set the condition code for its dependent branch. But it is noticed that the total instruction sequence takes 12 instruction cycles to execute the six operations because of the NOPs added.

The whole sequence can be optimized and reduced back to six instruction cycles by taking advantage of the out-of-order execution in the pipe. This would yield the following code sequence:

TABLE III

1. Compare A
2. Compare B
3. Compare C
4. Branch A
5. Branch B
6. Branch C

For this sequence, the first compare operation (A) will set the machine condition code just in time for its dependent branch. The same is true for B and C. If this sequence were executed on a normal, single instruction in-order machine, it would give incorrect results with all branches being based on the last compare (C). In the pipelined machine of Cosgrove, et al., it does give the desired eight way branch.

The problem with this sequence being executed out-of-order to produce correct results, is that it is very difficult to interrupt. Even inserting a single instruction NOP in this sequence would produce incorrect results. Interrupting the sequence at the completion of any instruction within the sequence could cause improper execution.

The problem solved by the invention disclosed herein, then, is to provide for:
a. interrupting a sequence of instructions which execute out-of-order in a pipelined machine, and
b. allowing a subsequent return to the interrupted program to resume processing of that program without error.

OBJECTS OF THE INVENTION

It is therefore an object of the invention to provide an improved manner for interrupting sequential patterns of instructions in an instruction pipeline.

It is still another object of the invention to provide an improved technique for interrupting compacted sequences of out-of-order machine instructions in an instruction pipeline.

It is still a further object of the invention to provide an improved means for determining when a particular sequence of machine instructions can be interrupted.

It is still a further object of the invention to provide an improved means for shutting down an instruction pipeline and generating the proper return address in an instruction pipelined data processor.

SUMMARY OF THE INVENTION

These and other objects, features and advantages of the invention are accomplished by the interrupt processor disclosed herein. An interrupt processor is disclosed for an instruction pipelined digital processor, which includes an instruction classification system with a logic class decoder, a multistage, pipelined interruptible-sequence detector, a multistage variable-return-address generator, and an active instruction completion, suppression, and termination control, to enable interrupting a sequence of instructions which execute out-of-order in the pipelined and digital processor, and to enable allowing a subsequent return to the interrupted program to resume processing of that program without error.

DESCRIPTION OF THE FIGURES

These and other objects, features and advantages of the invention will be more fully appreciated with reference to the accompanying figures.

FIG. 2 is a higher level functional block diagram of the instruction sequencing and fetch stage or Phase 1, referred to in FIG. 1.

DISCUSSION OF THE PREFERRED EMBODIMENT

Figure 1:
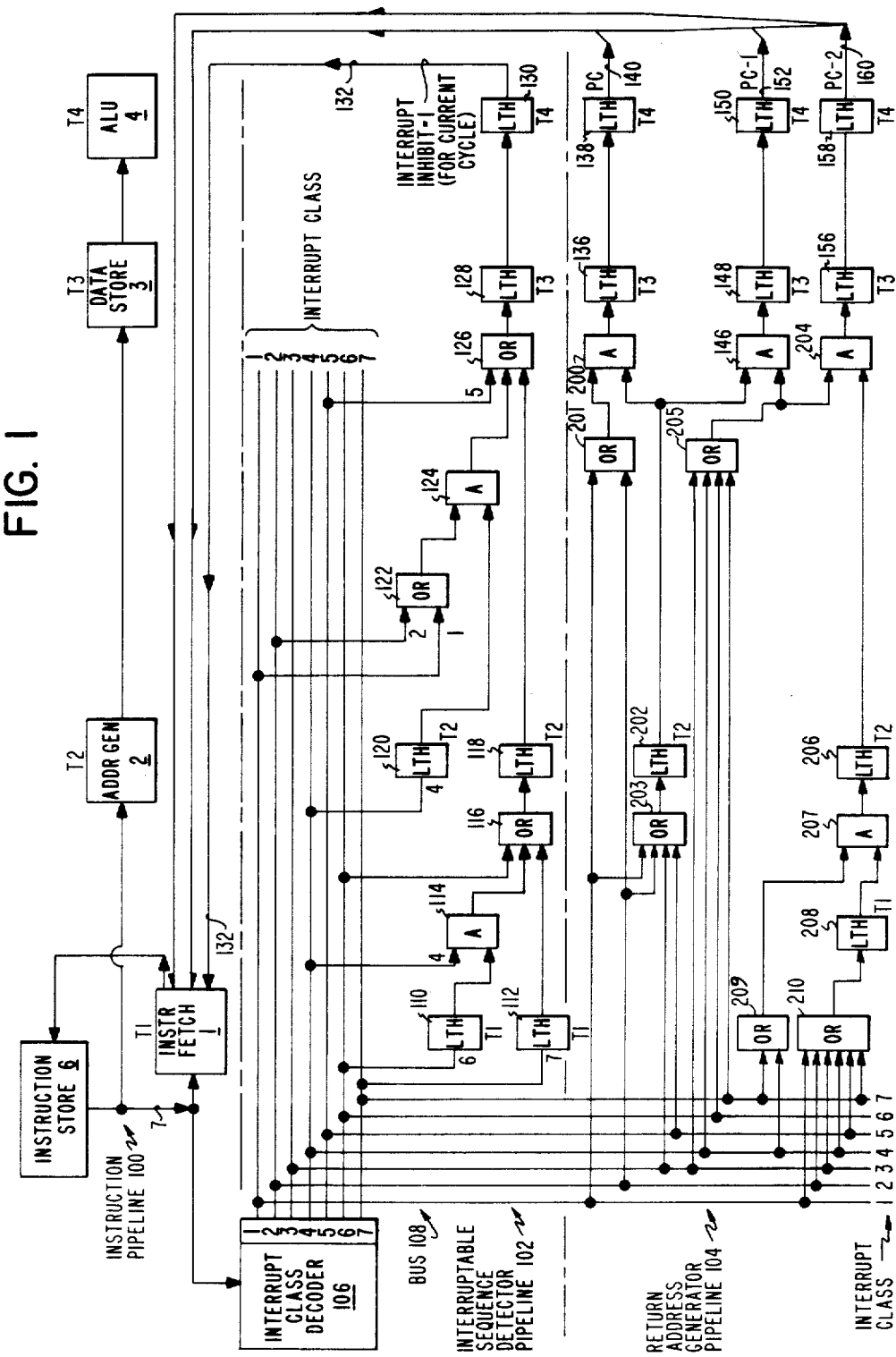
FIG. 1 is a detailed logic diagram of one form of the interrupt processor invention.

The basic principle of operation for the interrupt processor disclosed herein can be applied to a wide variety of data pipelines and instruction pipelines for determining when a particular sequence of data processing instructions or machine instructions can be interrupted and to provide an orderly way for shutting down the pipe and generating the proper return address. The specific host system within which the interrupt processor disclosed herein finds application, is described in the copending patent application by M. R. Cosgrove, et al. entitled "Instruction Address Stack in the Data Memory of an Instruction-Pipelined Processor," Ser. No. 280,417, filed June 30, 1981, and assigned to the instant assignee, now U.S. Pat. No. 4,399,507. The numbering of elements disclosed herein is compatible with the numbering of the elements disclosed in the Cosgrove, et al. patent application so as to enable easy cross-correlation for the reader. The disclosure in the Cosgrove, et al. patent application is incorporated herein by reference. The terms stage and phase are used interchangeably to denote the order in which the hardware units 2, 3 and 4 interact with an instruction fetched by first stage or Phase 1.

An interrupt processor is disclosed in FIGS. 1 and 2, for an instruction pipeline 100 having a sequence of instruction stages or Phases 1, 2, 3 and 4 which sequentially process a machine instruction in respective sequential machine cycles. The interrupt processor includes an interrupt class decoder 106 having an input connected to an instruction store 6, for decoding each machine instruction into an interrupt class and outputting a signal on a corresponding one of a plurality of interrupt class output lines 108. The interrupt processor further includes an interrupt sequence detector pipeline 102 having a sequence of staging registers and associated logic 110-130 which are connected to the interrupt class output lines 108 and which are sequentially gated in synchronism with the instruction stages 1, 2, 3 and 4 of the instruction pipeline 100, for sequentially propagating a non-interruptible sequence indicator bit to an output line 132. The interrupt processor further includes an interrupt register 174 in FIG. 2, having a data input connected to an interrupt request signal line 98, a control input connected to the output 132 of the interruptible sequence detector pipeline 102 and an output 176 connected to the instruction pipeline 100, for storing an interrupt signal when the non-interruptible sequence detector bit is input to the control input thereof, the interrupt signal being passed to the instruction pipeline when the detector bit is absent from the control input. In this manner, interruptions of the instruction pipeline can be selectively inhibited in response to the interrupt classes of the machine instructions in the instruction pipeline.

The interrupt processor further includes a return address generator pipeline 104 having a sequence of staging registers and associated logic ORs 203, 201, 205, 209, 210; ANDs 200, 207, 146, 204; and latches 202, 136, 130, 148, 150, 208, 206, 156, 158 which are connected to the interrupt class output lines 108 and which are sequentially gated in synchronism with the instruction stages of the instruction pipeline 100, for sequentially propagating a program count indicator to output lines 140, 152 or 160. A program counter storage including registers 164 and 168, is included in the interrupt processor, which has an input connected to the output of the program counter multiplexer 12, for storing previous program counter values. In response to the program count indicator from the return address generator pipeline 104, the stack register 18 will be used for storing the program counter value to which the instruction pipeline 100 is to return after an interrupt operation has been completed.

The interrupt processor determines if an interruptible sequence of instructions is in the instruction pipeline and then determines to which instruction address the program will return after the interrupt operation is completed.

FIG. 1 shows the interrupt processor wherein the instruction pipeline 100 has a sequence of instruction stages 1, 2, 3 and 4 which sequentially process machine instructions in respective sequential machine cycles T1, T2, T3, and T4, output from the instruction store 6.

FIG. 1 shows the interrupt class decoder 106 which has an input connected to the output 7 of the instruction store 6, for decoding each of the machine instructions into an interrupt class and outputting a signal on a corresponding one of seven interrupt class output lines 108.

An interruptible sequence detector pipeline 102 is shown in FIG. 1, which has a sequence of staging registers or latches 110, 112, 118, 120, 128 and 130, which are connected to the interrupt class output lines 108. The sequence of staging registers 110–130 are sequentially gated in synchronism with the instruction stages 1, 2, 3 and 4 of the instruction pipeline 100, for sequentially propagating a non-interruptible sequence indicator bit to an output line 132.

FIG. 2 shows a register 174 having a data input connected to an interrupt request signal line 98, a control input connected to the output 132 of the interruptible sequence detector pipeline 102, and an output 176 connected to the interrupt sequencing controls 20 of the instruction pipeline 100. The register 174 inhibits an interrupt signal by storing it when there is an interrupt request on line 98 and a non-interruptible sequence of instructions is currently in the instruction pipeline 100, as determined by the output of the interruptible sequence detector 102 on line 132. Alternately, the interrupt request signal on line 98 will be passed on line 176 to the interrupt and sequencing controls 20 when there is an interruptible sequence of instructions in the instruction pipeline as determined by the output on line 132.

In this manner, interruptions of the instruction pipeline 100 can be selectively inhibited in response to the interrupt classes of the machine instructions in the instruction pipeline.

FIG. 1 further shows the return address generator pipeline 104 which has a sequence of staging registers 208, 202, 206, 136, 148, 156, 138, 150 and 158 which are connected to the interrupt class output lines 108. These staging registers are sequentially gated in synchronism with the instruction stages 1, 2, 3 and 4 of the instruction pipeline 100, for sequentially propagating a program counter indicator to an output line 140, 152 or 160.

FIG. 2 shows the stack register 18 which is a program counter storage which has an input 172 (through a multiplexer) connected through the gated register circuit 162–170 to the output 140, 152 and 160 of the return address generator pipeline 104. The stack register 18 will store a program counter value in response to the program counter indicator input on line 140, 152 or 160, that program counter value being that value to which the instruction pipeline 100 is to return after the interrupt operation has been completed.

The resulting interrupt processor will determine when an interrupt can be taken, shutting down the instruction pipeline 100 in an orderly fashion, and generating the proper return address. The return address and any necessary machine status which may be needed upon the return, is saved. At the completion of the interrupting program, the interrupted machine state is restored and control is branched back to the saved return address.

OPERATION OF THE INVENTION

The principle of the invention is based on first determining if an interruptible sequence of instructions is in the pipeline, and then determining which instruction address to return to. These determinations are made such that when interrupts are taken, they are transparent to the software.

Reference will be made to the four stage pipelined instruction processor of the Cosgrove, et al. patent application cited above, in describing the operation of the invention herein.

Determination of an interruptible sequence of instructions is based on classifying all instructions into one of seven different classes and checking for five possible sequences which are non-interruptible. The classes of instructions are defined by the stage of the machine effected, and by the cycle in which it is effected. For an instruction to effect a stage significantly, it must change a register or storage location which will effect the operation of the following instructions in that stage. For example, loading a register in stage 2 of Cosgrove, et al. effects the state of stage 2 while using a register in stage 2 to generate an address does not effect the state of stage 2. Writing into the data store in stage 3 of Cosgrove, et al. effects that stage while reading the data store does not. The seven classes of instructions are:

Class 1:

Instructions which modify the program count value in the SAR 16, the save register 38 or stack register 18 in stage 1 of Cosgrove, et al. and do not require memory access. This includes the branch instructions. These instructions complete in stage 2.

Class 2:

Instructions which modify the stage 2 registers of Cosgrove, et al. (i.e. the increment registers W1 or W2) and do not require a memory access. These include the load index register 1 (LX1), load V register (LV) and add to index register 1 (AX1) instructions. These instructions complete in phase 2.

Class 3:

Instructions which store data in the memory of Cosgrove, et al. but do not effect the state of stages other than stage 3. The store Z register (STZ) instruction is a typical example of this class. These instructions complete in Phase 3.

Class 4:

Instructions which cause operations during cycle 4 in stage 4 of Cosgrove, et al. and do not effect other stages. All arithmetic operations using the arithmetic logic unit (ALU), such as add, subtract and compare, of Cosgrove, et al. fall into this class with the exception of multiply, divide, and arithmetic left shift which are special (Class 7) cases. Instructions loading the ALU registers such as load Y register (LY) and load Z register (LZ) are also in this class. These instructions require all four phases to complete.

Class 5:

Instructions which write into data store 8 and change the stack register 18 or read the data store stack 10 to the stack register 18 of Phase 1 in Cosgrove, et al. The branch and stack (BS) instruction which writes data store during Phase 3 and loads the stack at the end of Phase 2, and the return (RET) instruction which loads the stack register from data store in Phase 3 are the only Class 5 instructions. These instructions complete in Phase 3.

Class 6:

Instructions which read memory to load stage 2 registers. some of the load index register (LX1) instructions are in this class. These instructions complete in Phase 3.

Class 7:

Multiply, divide, and left shift instructions. These are treated as Class 4 instructions until they reach stage 4. Here an interrupt is inhibited until after completion of these operations. These instructions require all four phases to complete.

The following table shows the stages effected by the instructions as a function of the instruction class. For example, the BS instruction affects both stage 1 (SAR, save, and stack) registers and stage 3 (data store address and input) registers in those respective phases, while the LX instruction only affects stage 2 (index, mask, etc.) registers during Phase 3.

TABLE IV

| Instr. Class | Phase 1 | Phase 2 | Phase 3 | Phase 4 | Example |
|---|---|---|---|---|---|
| 1 | 1 | — | — | — | B |
| 2 | — | 2 | — | — | LX (immediate) |
| 3 | — | — | 3 | — | STZ |
| 4 | — | — | — | 4 | AZ |
| 5 | 1 | — | 3/1 | — | BS |
| 6 | — | — | 2 | — | LX (from memory) |
| 7 | — | — | — | 4 | DIV |

This table is the basis for the classification of all instructions.

Instruction class determination is implemented by the decoder 106 decoding of the instruction op code. Only Class 7 instructions require special handling because they are treated as Class 4 instructions through their first three cycles of execution and then as Class 7 instructions for as many cycles as they require repetitive iterations in the fourth stage of the RSP pipeline 100.

A non-interruptible sequence is any sequence of instructions which if interrupted would cause operations within the pipeline to be executed out of order. That is, if an interrupt occurs where one instruction has partially or fully completed operation while a preceding instruction has not fully completed its operation, there may be no practical way to stop the operation of the instruction pipeline 100 and accept an interrupt because the incompleted instructions may not be re-executed if the following instructions have changed the state of the pipe 100.

Up to four consecutive instructions may have to be considered to determine if an interrupt may be accepted. Since most sequences of instructions are interruptible, it is simplest to define the five sequences which are non-interruptible, and described why they are non-interruptible.

Consider the sequence of instructions 'a', 'b', 'c', and 'd'. In the following it is assumed that they are in Phases 4, 3, 2 and 1, respectively of the instruction pipeline 100 when an interrupt request is received on line 98. It is also assumed that instruction 'd' is any class instruction and was in the process of being fetched from instruction store 6 (Phase 1 of its instruction cycle) when the interrupt occurred. The processor holds the interrupt off until the fetch of 'd' is completed. During the completion of the fetch of 'd', the instruction pipeline sequence is examined in the detector pipeline 102 for a non-interruptible sequence. The following Table V summarizes the five non-interruptible pipeline sequences.

TABLE V

| | Non-Interruptible Sequences (Hardware Phase) | | | |
|---|---|---|---|---|
| | Ph1 d | Ph2 c | Ph3 b | Ph4 a |
| (1) | — | — | 4 | 6 |
| (2) | — | 2 | 4 | — |
| (3) | — | — | 6 | — |
| (4) | — | 1 | 4 | — |
| (5) | — | 5 | — | — |

The following is an explanation of why each sequence in the above Table V is non-interruptible.

1. Instruction sequence (1) is non-interruptible because the Class 6 instruction (instruction 'a') has completed and has modified (updated) the index registers. However, the Class 4 instruction (instruction 'b') which used the old value of the index registers in its operation (i.e. the value prior to being modified by 'a'), has not completed. If this sequence were interrupted, there would be no way to recover the old value of the index register and re-execute instruction 'b', since the index has been modified by the Class 6 instruction (instruction 'a').

2. Instruction sequence (2) is non-interruptible for the same reasons as sequence (1). That is, the Class 2 instruction ('c') has completed and has modified the index registers, however the Class 4 instruction ('b') which used the old value of the index register has not completed. Thus if this sequence were interrupted, there would be no way to recover the old index register value because it has since been modified by 'b'.

3. Instruction sequence (3) is non-interruptible for the same type of reason as sequences (1) and (2). That is, the Class 6 instruction ('b') has completed and modified the index registers. Thus any other instruction in the pipeline which may need the old index register values could not recover them if an interrupt was allowed.

NOTE: Although this case may cause certain sequences of 'c' and 'd' (where the index register is not used) to be flagged as non-interruptible, it is felt that this is not a severe restriction.

4. Instruction sequence (4) is non-interruptible because instruction 'b' (a Class 4 instruction) has not yet completed, but instruction 'c' (a Class 1 instruction) has completed based upon condition codes which were set by instructions which have already been completed. Instruction 'a' may have changed these condition codes and thus instruction 'c', which may require old condition codes, could not be re-executed.

5. Instruction sequence (5) is non-interruptible because instruction 'a' (a Class 5 instruction) has changed the stack and address pointers but has not completed and has not stored the stack value away. Thus if an interrupt were allowed, there would be no way to recover the old values of the SP, PC, etc. which were present when instruction 'c' was fetched.

The multistage, pipelined, interruptible-sequence detector 102 of FIG. 1 is implemented to detect the non-interruptible sequences defined above. This detector is a four stage, single bit pipeline where each instruction in the instruction pipeline 100 will be classified as to its interrupt class by the interrupt decoder 106, and a corresponding detector bit will be output from it on one of the lines 1 to 7 of bus 108. The detector bit at each stage of the detector pipeline 102 will be shifted down the pipe 102 one stage each cycle, except for the cycles when a multicycle instruction is executing in stage four. When the fourth stage latch 130 is turned on, any interrupt request which may have occurred on line 98 is inhibited by line 132, for example, from occurring during that cycle.

As an example, referring to FIG. 1, a Class 5 instruction will turn on stage 3 of the interrupt pipe 102 by setting the latch 128. During the following cycle, the detector bit in stage 3 will have been shifted into stage 4 setting the latch 130, causing it to turn on and inhibit interrupts during that cycle.

After determining that an interrupt can be taken, there are some additional functions which must be implemented to cause an orderly and recoverable interrupt. As an example, the instructions in the Cosgrove, et al. instruction pipeline 100 must be suspended in an orderly fashion. This requires the simultaneous application of instruction suppression, termination, and completion functions. The instruction in the first stage of the Cosgrove, et al. instruction pipeline 100 is totally suppressed. The instruction in the fourth stage of the Cosgrove, et al. instruction pipeline 100 is allowed to complete execution. In the second and third stages, instructions are allowed to complete execution in that respective stage but are suppressed from any further execution in subsequent stages. This is done by forcing NOPs into their staged op code register.

When an interrupt is finally accepted, the return address is not always the address of the instruction currently being fetched. It may be the previous instruction or the one prior to that, depending upon the actual instruction sequence in the instruction pipeline 100 when the interrupt occurs. The following table lists the three cases for defining the return address for an interrupt for various pipeline instruction sequences.

Again it is assumed that instruction 'd' is any class instruction and was in the process of being fetched when the interrupt occurred. As before, the processor holds the interrupt off until the fetch of 'd' is complete. If it has been determined that the sequence of instructions in the pipeline is interruptible, the interrupt is taken, and the interrupt return address is calculated as 'd' (for sequence 1), 'c' (for sequence 2), or 'b' (for sequence 3).

TABLE VI

| | Return Address for Different Interruptible Sequence Classes (Hardware Phase) | | | |
|---|---|---|---|---|
| | Ph1 d | Ph2 c | Ph3 b | Ph4 a |
| (1) | — | 1,2 | 1,2,3,5 | — |
| (2) | — | 3,4,6,7 | 1,2,3,5 | — |
| (3) | — | 3,4,6,7 | 4,7 | 1-5 or 7 |

The following is an explanation of why the return address is as stated in Table VI and which instruction gets re-executed after the interrupt.

1. The return address for sequence (1) is 'd', which means simply re-execute instruction 'd'. This is so because instruction 'c' which is a Class 1 or 2 instruction has completed in Phase 2, and instruction 'b' which is a Class 1, 2, 3, or 5 instruction completed in Phase 3 or earlier. The processor simply inserts NOPs in the pipe in place of the completed instructions ('c', 'b', and 'a') when it re-executes instruction 'd'.

2. The return address for sequence (2) is 'c', which means back up one instruction and re-execute instruction 'c'. It must do this since instruction 'c' which is a Class 3, 4, 6, or 7 instruction has not yet completed but instruction 'b' which is a Class 1, 2, 3, or 5 instruction completed in Phase 3 or earlier. Again the processor simply inserts NOPs for instructions 'b' and 'a' when it re-executes instruction 'c'.

3. The return address for sequence (3) is 'b', which means the pipeline must be backed up two instructions to instruction 'b'. This is because instruction 'b' being a Class 4 or 7 instruction has not completed. The reasons that instruction 'a' is not an any class instruction, is because if it were a Class 6 instruction, the sequence would have been non-interruptible. Also if instruction 'c' were a Class 1, 2, or 5 instruction, it would have been a non-interruptible sequence.

A multistage, variable return-address generator pipeline 104, as shown in FIG. 1, is implemented to determine the returned address at which the interrupted program may resume execution. The address generator pipeline 104 is a staged logic tree with three different outputs 140, 152 and 160, one for each of the three possible return addresses. As is shown in FIG. 1, the return address may be the current PC (program counter address value) or the PC1 or PC2. Again, as in the interrupt detector 102, this design shows pipelined sequence decoding which, in this case, determines the return address.

The actual return address, as determined by the logic tree 104, may be determined by using the current PC value or subtracting either 1 or 2 from it. Rather than performing a subtraction, the two previous PC values may be saved in registers 164 and 168. Either way will give the correct value.

With the interrupt mechanism of FIG. 1 determining when an interrupt can be taken, shutting down the pipe in an orderly fashion, and generating the proper return address, the remainder of the interrupt and recovery process is similar to any standard processor. The return address and any necessary machine status which may be upset, is saved. At the completion of the interrupting program, the interrupted machine state is restored and control is branched back to the saved return address.

EXAMPLE OF OPERATION

FIG. 1 shows the interrupt sequence detector pipeline logic 102 and the return address generator pipeline logic 104. There are several examples that can be used to demonstrate how this logic in this particular case performs the functions of generating the interruptible sequences and determining which return address should be used. Referring to FIG. 1 showing the interrupt sequence detector pipeline 102, consider the example of an interrupt class 7 signal. When the signal arrives on bus 108 it will set the latch 112 on the first cycle. On the following cycle, that signal will propagate through the OR gate 116 and set latch 118. Two cycles later, that signal will propagate through OR gate 126 and set latch 128. On the third cycle, that signal will propagate on through to set latch 130 causing an inhibit of the interrupt, that is it sets the interrupt inhibit signal to 1 on line 132 to inhibit any interrupt from occurring on that cycle.

There are a number of other cases in which the detector pipeline logic 102 can cause the inhibiting of an interrupt. A class 4 interrupt signal on bus 108 will set latch 120 on the following cycle if there is either a class 1 or class 2 interrupt signal going through OR gate 122 and combined with the latch 120 output in AND gate 124. These signals will set latch 128. Also, a class 5 interrupt signal going through OR gate 126 could set latch 128 on the following cycle. This will again set latch 130 which will inhibit an interrupt for that cycle. Thus, here are two examples of signals or combinations of signals which can go through the detector sequence pipeline 102 to set up an interrupt inhibit.

The logic of the return address generator pipeline 104 works in a similar fashion with various combinations of sequential instructions setting latches in the various stages to finally set up one of three different signals to determine what the return address will be. The return address can either be the current program counter (PC), the preceding value of the program counter (PC-1) or the second preceding value (PC-2).

In the return address generator pipeline 104, consider the case of an interrupt class 1, 2, 3 or 5 signal on bus 108 coming into gate 203 and setting latch 202. On the following cycle, that signal would be AND'ed with either interrupt class 1 or 2 signals from 201 in the AND gate 200 to set latch 136. Thus in this case, we have a combination of one of four signals 1, 2, 3 or 5 on one cycle, followed by either a 1 or 2 class signal on the following cycle to set latch 136. The cycle after that, that signal will set latch 138. Thus if an interrupt occurs on that cycle, that the current value of the program counter (PC) will be a return address to be used. An enabling signal passes over line 140 to the gate 162 in FIG. 2, causing the current value of the program counter (PC) to be input to the stack register 18 as the return address.

Previous values of the program counter may be selected by other combinations or sequences of interrupt class instructions. Consider the case of a 1 or 2 or 3 or 5 occurring on bus 108 on one cycle, setting latch 202 again. This signal on the following cycle will be AND'ed in AND gate 146 with the combination of either interrupt class 3, 4, 6 or 7 from the OR gate 205, setting latch 148. The cycle after that, latch 150 would be set so that the program counter minus one (PC-1) will be used as the return address. The PC-2 return address may be selected by any one of a number of sequence of instructions. Consider the case of either interrupt class signals 1, 2, 3, 4, 5 or 7 combining in OR gate 210 and setting latch 208. On the following cycle, that signal is combined in AND gate 207 with the OR of instruction classes 4 or 7 are together in gate 209. Given that that sequence of instructions on the two cycles occurs, latch 206 will be set. The cycle after that, the output of latch 206 is AND'ed in AND gate 204 with the combinations of any of the signals 3, 4, 6 or 7 which have been OR'ed together in gate 205 during that cycle. The resultant signal going through AND gate 204 will set latch 156 on the following cycle. This will set latch 158 indicating that the value of the program counter minus two (PC-2) will be the selected return address for any interrupt occurring on that cycle.

This demonstrates the flow of sequences of interrupt class signals through the combinational and sequential pipeline logic of the interrupt sequence detector pipeline 102 and the return address generator pipeline 104.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. In a data processor, an interrupt processor instruction pipeline having a sequence of instruction stages which sequentially process a machine instruction in respective sequential machine cycles, output from an instruction store, comprising:
   an interrupt class decoder having an input connected to the output of said instruction store, for decoding each said machine instruction into an interrupt class and outputting a signal on a corresponding one of a plurality of interrupt class output lines;
   an interrupt sequence detector pipeline having a sequence of staging registers which are connected to said interrupt class output lines and which are sequentially gated in synchronism with said instruction stages of said instruction pipeline, for sequentially propagating a non-interruptible sequence indicator bit to an output line;
   a register having a data input connected to an interrupt signal line, a control input connected to said output of said interruptible sequence detector pipeline and an output connected to said instruction pipeline, for storing an interrupt signal when said noninterruptible sequence detector bit is input to said control input thereof, said interrupt signal being passed to said instruction pipeline when said detector bit is absent from said control input;
   whereby interruptions of said instruction pipeline can be selectively inhibited in response to said interrupt classes of said machine instructions in said instruction pipeline.

2. The apparatus of claim 1, which further comprises:
   a return address generator pipeline having a sequence of staging registers which are connected to said interrupt class output lines and which are sequentially gated in synchronism with said instruction stages of said instruction pipeline, for sequentially propagating a program counter indicator to an output line;
   a program counter storage means having an input connected to said output of said return address generator pipeline, for storing a program counter value in response to said program counter indicator input thereto, for storing the program counter to which said instruction pipeline is to return after an interrupt operation has been completed.

* * * * *